United States Patent
Kadowaki (10) Patent No.: US 7,444,140 B2
(45) Date of Patent: Oct. 28, 2008

(54) MOBILE COMMUNICATION NETWORK APPARATUS, BASE STATION, AND MOBILE STATION

(75) Inventor: Masanori Kadowaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 10/746,326

(22) Filed: Dec. 23, 2003

(65) Prior Publication Data
US 2004/0166836 A1 Aug. 26, 2004

(30) Foreign Application Priority Data
Feb. 21, 2003 (JP) ............... 2003-044319

(51) Int. Cl.
*H04M 3/42* (2006.01)
*H04Q 7/20* (2006.01)

(52) U.S. Cl. ...................... 455/417; 455/445

(58) Field of Classification Search ............... 455/445, 455/439, 417, 403, 432.1, 404.2
See application file for complete search history.

(56) References Cited

U.S. PATENT DOCUMENTS

| | | | |
|---|---|---|---|
| 5,812,949 A * | 9/1998 | Taketsugu | 455/439 |
| 5,903,833 A * | 5/1999 | Jonsson et al. | 455/417 |
| 6,363,246 B1 * | 3/2002 | Williams et al. | 455/403 |
| 6,519,454 B1 * | 2/2003 | Calabrese et al. | 455/432.1 |
| 6,519,459 B1 * | 2/2003 | Chavez et al. | 455/445 |
| 6,647,259 B1 * | 11/2003 | Boyle et al. | 455/417 |
| 6,856,806 B1 * | 2/2005 | Bosik et al. | 455/445 |
| 6,937,860 B2 * | 8/2005 | Jahn | 455/436 |
| 2002/0004385 A1 * | 1/2002 | Yamamoto et al. | 455/417 |

FOREIGN PATENT DOCUMENTS

| | | |
|---|---|---|
| JP | 7-087568 | 3/1995 |
| JP | 2000-023248 | 1/2000 |
| JP | 2001-218264 | 8/2001 |
| JP | 2001-298776 | 10/2001 |
| JP | 2002-044723 | 2/2002 |

OTHER PUBLICATIONS

Notification of Reason(s) for Refusal dated May 1, 2007, from the corresponding Japanese Application.

* cited by examiner

Primary Examiner—Joseph Feild
Assistant Examiner—Kiet Doan
(74) Attorney, Agent, or Firm—Katten Muchin Rosenman LLP (57) ABSTRACT

In a mobile communication network apparatus, a base station, and a mobile station which transfer an incoming call for the mobile station to a predetermined transfer destination, the mobile communication network apparatus transfers the incoming call for the mobile station based on a transfer destination table which associates a specific base station with a transfer destination telephone number. Alternatively, the base station makes a transfer setting request which activates the incoming call for the mobile station located in its communication area to be transferred to a predetermined transfer destination telephone number, to the mobile communication network apparatus. Alternatively, the mobile station transmits a transfer setting request which activates the incoming call for its own station to be transferred to a predetermined telephone number, to the mobile communication network apparatus through the specific base station when incoming call transfer control information transmitted by the specific base station is received.

21 Claims, 10 Drawing Sheets

```
System Parameters Message                    ~721
    PILOT_PN
    CONFIG_MSG_SEQ
    SID
    NID
    REG_ZONE
    TOTAL_ZONES
    ZONE_TIMER
    MULT_SIDS
    MULT_NIDS
    BASE_ID
    BASE CLASS : TRANSFER SERVICE
    PAGE_CHAN
    ...
```

FIG.8B

```
Registration Message                         ~722
    REG TYPE : TRANSFER SETTING REQUEST
    SLOT_CYCLE_INDEX
    MOB_P_REV
    SCM
    MOB_TERM
    RETURN_CAUSE
```

FIG.8C

```
Location Updating Request                    ~723
    Protocol Discriminator
    Reserved - Octet
    Message Type
    Mobile Identity (IMSI) : MOBILE STATION NO.
    Location Area Identification : BASE STATION NO.
    Registration Type : TRANSFER SETTING REQUEST
```

MOBILE COMMUNICATION NETWORK APPARATUS, BASE STATION, AND MOBILE STATION

BACKGROUND OF THE INVENTION

1. Field of the Invention

The present invention relates to a mobile communication network apparatus, a base station, and a mobile station, and in particular to a mobile communication network apparatus, a base station, and a mobile station which transfer an incoming call for the mobile station to a predetermined transfer destination.

In recent years, a rapid widespread of mobile stations such as mobile telephones followed by advances in mobile communication technology has been fundamentally changing economies and societies. In such a mobile communication, it is important to construct e.g. an incoming call transfer system which transfers an incoming call for a mobile station to another receiving station, in consideration of users' convenience.

2. Description of the Related Art

In recent years, there is a move to regulate calls of mobile telephones or the like which annoy others in public places such as a hospital, concert hall, bullet train, train, and bus.

Based on such a background, a prior art mobile communication system disclosed has a mobile station, a base station, a control center for managing a plurality of base stations, means for detecting whether or not the mobile station is in an incoming call prohibited place, and announcement prohibiting means for prohibiting an announcement of incoming call ringing to the mobile station when the mobile station is in the incoming call prohibited place according to the detection result.

Also, there is a prior art technology that the mobile communication system has message recording/reproducing means for recording a message from a transmitting source and for reproducing the message in response to a request of a mobile station user, in order to reduce disadvantage of losing an opportunity to obtain information due to an incoming call prohibition (see e.g. patent document 1).

This mobile communication system is for recording/reproducing the message in response to the request of the mobile station user, and is not for making a direct conversation of the transmitting source with the mobile station user.

There is a prior art mobile communication system and its transfer destination setting method of a mobile unit comprising a mobile telephone exchange as well as a fixed telephone and a radio wave transmitting device located in an assembly room or the like, respectively connected to a public communication network, a plurality of mobile units having a radio telephone function managed by the mobile telephone exchange, wherein the radio wave transmitting device is provided with signal generating/transmitting means for generating a transfer destination setting reception signal of a predetermined radio frequency indicating that the radio wave transmitting device can accept a transfer destination to be radio-transmitted continuously, request signal transmitting means for calling the mobile telephone exchange which receives a first response signal including a telephone number from a mobile unit responsive to the transfer setting reception signal with a predetermined first channel and for transmitting a transfer destination setting request signal together with the telephone number of the mobile unit which has transmitted the first response signal and a telephone number of the fixed telephone of a preset transfer destination, location confirming means for transmitting a location confirming signal from a predetermined second channel together with the telephone number of the mobile unit for the mobile unit having transmitted the first response signal after transmitting the transfer destination setting request signal and for receiving a second response signal together with the telephone number of the mobile unit for the location confirming signal with a predetermined third channel and, releasing means for transmitting a release signal for requesting a transfer destination setting release for the mobile unit to the mobile telephone exchange in the absence of the second response signal responsive to the location confirming signal, whereby an incoming call for the mobile unit which has moved to an area such as an assembly room which is outside of a mobile communication area is automatically transferred (see e.g. patent document 2).

Namely, without troubling a user on a mobile terminal side, a transfer destination to a fixed telephone is automatically set even if a mobile terminal moves out of a mobile communication area, and this transfer setting is automatically released if the mobile terminal returns to the area.

[Patent Document 1]
Japanese Patent Application Laid-open No. 7-87568 (page 2, FIG. 1)

[Patent Document 2]
Japanese Patent Application Laid-open No. 2001-298776 (page 2, FIG. 1)

However, this mobile communication system and the transfer destination setting method of the mobile unit (mobile station) are for performing an incoming call transfer for the mobile unit which has moved out of a service area of the mobile communication network, and require a radio wave transmitting device for detecting that the mobile unit has entered a predetermined area outside the service area of the mobile communication network. Also, it is required for the radio wave transmitting device to transmit, to a mobile telephone exchange, a transfer destination setting request signal including telephone numbers of the mobile unit and of a transfer destination fixed telephone preset.

SUMMARY OF THE INVENTION

It is accordingly an object of the present invention to provide a mobile communication network apparatus, a base station, and a mobile station which transfer an incoming call for a mobile station to a predetermined transfer destination, wherein an incoming call for the mobile station which has moved to a call-regulated area within a service area of the mobile communication network is transferred to a predetermined transfer destination.

In order to achieve the above-mentioned object, a mobile communication network apparatus according to the present invention comprises: a transfer destination table which associates a specific base station with a transfer destination telephone number of an incoming call for a mobile station located in a communication area of the base station; and an incoming call transfer control circuit for transferring the incoming call for the mobile station through the specific base station based on the transfer destination table.

Namely, a mobile communication network apparatus is provided with a transfer destination table and an incoming call transfer control circuit. In this transfer destination table, a specific base station is associated with a transfer destination telephone number of an incoming call for a mobile station located in a communication area of the base station. The incoming call transfer control circuit transfers the incoming call for the mobile station to a transfer destination telephone number based on the transfer destination table.

Thus, it can be avoided to directly call the mobile station located in the communication area of the specific base station. Namely, it becomes possible to transfer an incoming call for a mobile station which has moved to a service area where calls are regulated to a predetermined telephone number.

It is to be noted that the transfer destination telephone number may be a telephone number of a mobile station or a fixed telephone. Also, as for a registration of the specific base station in the transfer destination table, the specific base station may be preliminarily registered in the transfer destination table or may be registered from each specific base station.

The transfer destination telephone number corresponding to the specific base station is likewise registered in the transfer destination table. Also, as the transfer destination table, a location registering table may be used.

Also, in the above-mentioned present invention, the incoming call transfer control circuit may receive a transfer setting request from the specific base station, thereby activating an incoming call for the mobile station, to be transferred, located in the communication area of the specific base station.

Also, in the above-mentioned present invention, the transfer setting request may be included in a location updating request. Thus, the transfer setting request can be easily received by using a prior art location updating request.

Also, in the above-mentioned present invention, the transfer destination table may associate a transfer destination telephone number with each mobile station. Thus, an incoming call can be transferred to a telephone of a different telephone number for each mobile station.

Also, in the above-mentioned present invention, the transfer destination telephone number may be notified from the mobile station through the specific base station.

Also, in the above-mentioned present invention, information for releasing a transfer destination of the transfer destination table may be notified from the mobile station through the specific base station.

Namely, the mobile station can notify information for releasing a transfer destination telephone number of the transfer destination table to the mobile communication network apparatus through the specific base station.

When receiving the notification, the incoming call transfer control circuit of the mobile communication network apparatus does not transfer the incoming call for the mobile station.

Thus, it becomes possible not to transfer the incoming call by e.g. the state of the mobile station or designation from the mobile station.

It is to be noted that as information for releasing (deactivating) the transfer destination, e.g. "power-down of the mobile station", "reception intensity of the mobile station is equal to or less than a predetermined threshold value", "location registration of a base station other than the specific base station", or the like is possible.

Also, in the above-mentioned present invention, the base station may transmit a transfer setting request upon a power-down of the mobile station as a trigger.

Namely, contrary to the above-mentioned present invention, the incoming call for the mobile station where the power is down may be transferred.

Furthermore, in the above-mentioned present invention, the incoming call transfer control circuit may vocally notify an incoming call transfer to a transmitting source.

In order to achieve the above-mentioned object, a base station according to the present invention comprises: a registration message receiver for receiving a registration message from a mobile station located in a communication area of the base station; and a transfer setting processor for making a transfer setting request which activates an incoming call for a mobile station located in the communication area to be transferred to a predetermined transfer destination telephone number, to a mobile communication network apparatus.

Namely, a registration message receiver receives a registration message from a mobile station located in its own communication area. A transfer setting processor transmits a transfer setting request which activates an incoming call for a mobile station located in the communication area to be transferred to a predetermine transfer destination telephone number to a mobile communication network apparatus.

Thus, it becomes possible to transfer the incoming call for the mobile station located in the communication area of the base station to a designated telephone number.

It is to be noted that the transfer destination telephone number may be a telephone number of the mobile station or the fix telephone. Also, the transfer destination telephone number may be preliminarily set in the mobile communication network apparatus associated with the base station, or may be notified from the base station.

Also, when the incoming call is transferred in the mobile communication network apparatus, the transfer may be vocally notified to a transmitting source.

Also, in the above-mentioned present invention, the transfer setting request may be included in a location updating request. Thus, the transfer setting request can be easily transmitted by using a prior art location updating request.

Also, in the above-mentioned present invention, the transfer destination telephone number may be associated with each mobile station. Thus, it becomes possible to transfer an incoming call to a different telephone number for each mobile station.

Also, in the above-mentioned present invention, the transfer destination telephone number may be notified from the mobile station. Namely, each mobile station notifies a transfer destination telephone number, corresponding to its own station, included in e.g. the registration message to the mobile communication network apparatus.

Also, in the above-mentioned present invention, the transfer setting processor may notify information for releasing a transfer setting of the incoming call to the mobile communication network apparatus. Thus, it becomes possible not to transfer the incoming call by e.g. the state of the mobile station or the designation of the mobile station.

It is to be noted that as information for releasing the transfer setting, e.g. "power-down of the mobile station", "reception intensity of the mobile station is equal to or less than a predetermined threshold value", "setting other than transfer setting", or the like is possible.

Furthermore, in the above-mentioned present invention, the transfer setting processor may transmit the transfer setting request upon a power-down of the mobile station as a trigger. Thus, contrary to the above-mentioned present invention, the incoming call for the mobile station where the power is down may be transferred.

In order to achieve the above-mentioned object, a mobile station according to the present invention comprises: a receiving circuit of incoming call transfer control information for receiving incoming call transfer control information transmitted by a specific base station; and a transmitting circuit of incoming call transfer request/release for transmitting a transfer setting request which activates an incoming call for its own station to be transferred to a predetermined telephone number, to a mobile communication network apparatus through the specific base station when the receiving circuit receives the incoming call transfer control information.

Namely, a specific base station transmits incoming call transfer control information. When a receiving circuit of incoming call transfer control information receives the incoming call transfer control information, a transmitting circuit of incoming call transfer request/release transmits a transfer setting request to a mobile communication network apparatus through the specific base station, and activates the incoming call for itself to be transferred to a predetermined transfer destination telephone number.

Thus, it becomes possible to transfer the incoming call for the mobile station located in the communication area of the specific base station which transmits the incoming call transfer control information to the designated telephone number.

It is to be noted that the transfer destination telephone number may be a number of a mobile station or a fixed telephone.

Also, the transfer destination telephone number may be preset in the mobile communication network apparatus associated with the specific base station, or may be notified from the base station.

Also, when transferring the incoming call, the mobile communication network apparatus may vocally notify the transfer to the transmitting source.

Also, in the above-mentioned present invention, the transfer setting request may be included in a location updating request. Thus, the transfer setting request can be easily transmitted by using a prior art location updating request.

Also, in the above-mentioned present invention, the mobile communication network apparatus may preliminarily hold the transfer destination telephone number.

Also, in the above-mentioned present invention, the transmitting circuit of incoming call transfer request/release may notify the transfer destination telephone number to the mobile communication network apparatus.

It is to be noted that the transfer destination telephone number may be preliminarily held by the mobile station or may be set from outside.

Also, in the above-mentioned present invention, the transfer destination telephone number may be associated with each mobile station. Thus, an incoming call can be transferred to a telephone of a different telephone number for each mobile station.

Also, in the above-mentioned present invention, the transfer destination telephone number may be notified from the specific base station. Namely, the specific base station notifies the transfer destination telephone number included e.g. in the incoming call transfer control information to the mobile station.

Also, in the above-mentioned present invention, the transmitting circuit of incoming call transfer request/release may notify a transfer setting release request for releasing transfer setting to the mobile communication network apparatus when the incoming call transfer control information is not received for more than a fixed time, when an intensity of radio wave becomes equal to or less than a predetermined threshold value, or when a power-down switch is activated.

Also, in the above-mentioned present invention, the transmitting circuit of incoming call transfer request/release may notify a transfer setting request to the mobile communication network apparatus when a power-down switch is activated.

Namely, contrary to the above-mentioned request, when the incoming call transfer control information is received and the power-down switch is activated, the transfer setting request may be notified to the mobile communication network apparatus. Thus, in the communication area of the specific base station, the incoming call for the mobile station where the power is down is automatically transferred.

Furthermore, in the above-mentioned present invention, the receiving circuit of incoming call transfer control information may lower a threshold value of a signal intensity corresponding to the specific base station when signals are received from a plurality of base stations. Thus, it becomes possible to suppress a handover to a usual base station from the specific base station.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
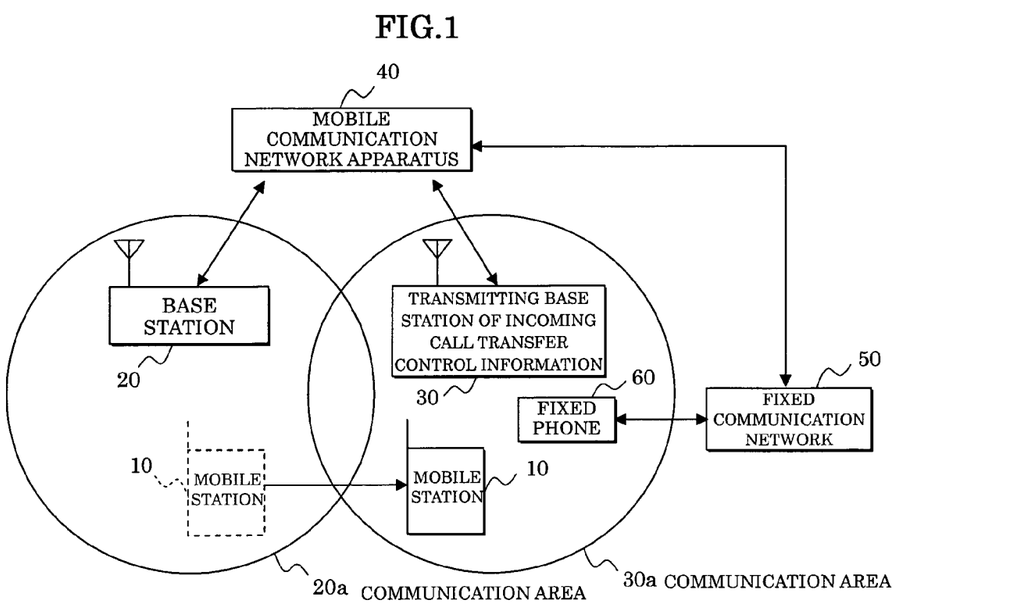
FIG. 1 is a block diagram showing an embodiment having, as elements, a mobile communication network apparatus, a transmitting base station of incoming call transfer control information, and a mobile station according to the present invention.

FIG. 1 shows an embodiment of the present invention, which shows a network arrangement including a mobile station 10, a transmitting base station 30 of incoming call transfer control information, and a mobile communication network apparatus 40 according to the present invention respectively.

In this network, a prior art base station 20, the transmitting base station 30 of incoming call transfer control information according to the present invention, and a fixed communication network 50 are connected to the mobile communication network apparatus 40 according to the present invention. Also, a fixed telephone 60 is connected to the fixed communication network 50.

The base stations 20 and 30 respectively have communication areas 20a and 30a. The mobile station 10 has moved from the communication area 20a and is located in the communication area 30a.

Figure 2:
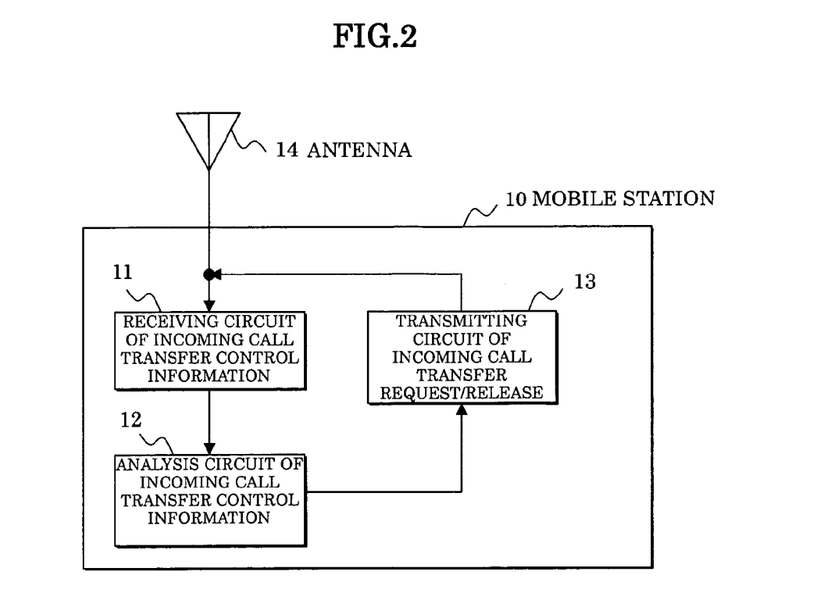
FIG. 2 is a block diagram showing an embodiment of a mobile station according to the present invention.

FIG. 2 shows an embodiment of the mobile station 10 according to the present invention. In this mobile station 10, a receiving circuit 11 of incoming call transfer control information, an analysis circuit 12 of incoming call transfer control information, and a transmitting circuit 13 of incoming call transfer request/release are connected in cascade in this order, and an antenna 14 is commonly connected to an input terminal of the receiving circuit 11 and an output terminal of the transmitting circuit 13.

The receiving circuit 11 and the analysis circuit 12 are means for detecting that the mobile station 10 has entered the communication area 30a of the base station 30. The transmitting circuit 13 automatically transmits, according to the analysis result of the analysis circuit 12, a transfer setting request for setting the incoming call for the mobile station 10 to be transferred, to the mobile communication network apparatus 40 through the base station 30.

Figure 3:
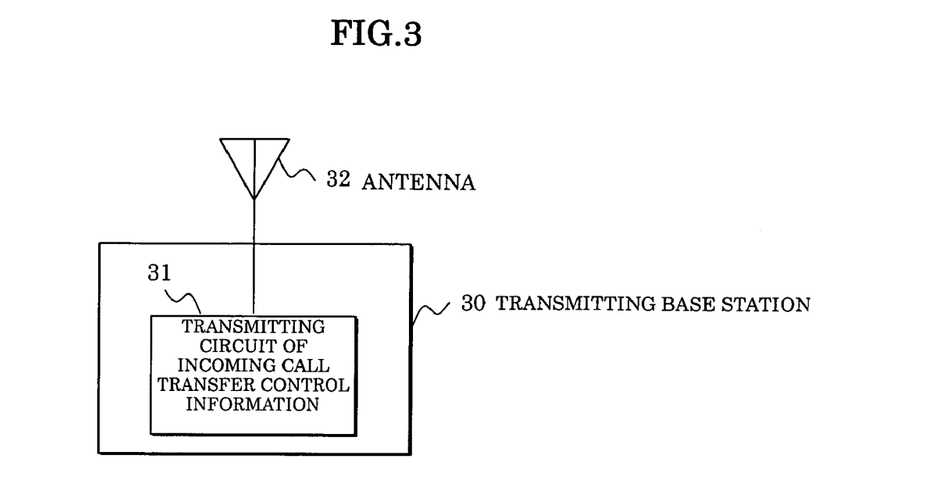
FIG. 3 is a block diagram showing an embodiment of a transmitting base station of incoming call transfer control information according to the present invention.

FIG. 3 shows an embodiment of the transmitting base station 30 of incoming call transfer control information of the present invention. In this base station 30, a transmitting circuit 31 of incoming call transfer control information and an antenna 32 connected thereto are provided. The transmitting circuit 31 provides to the mobile station incoming call transfer control information indicating that the base station 30 should transfer the incoming call for the mobile station located in the communication area 30a.

Figure 4:
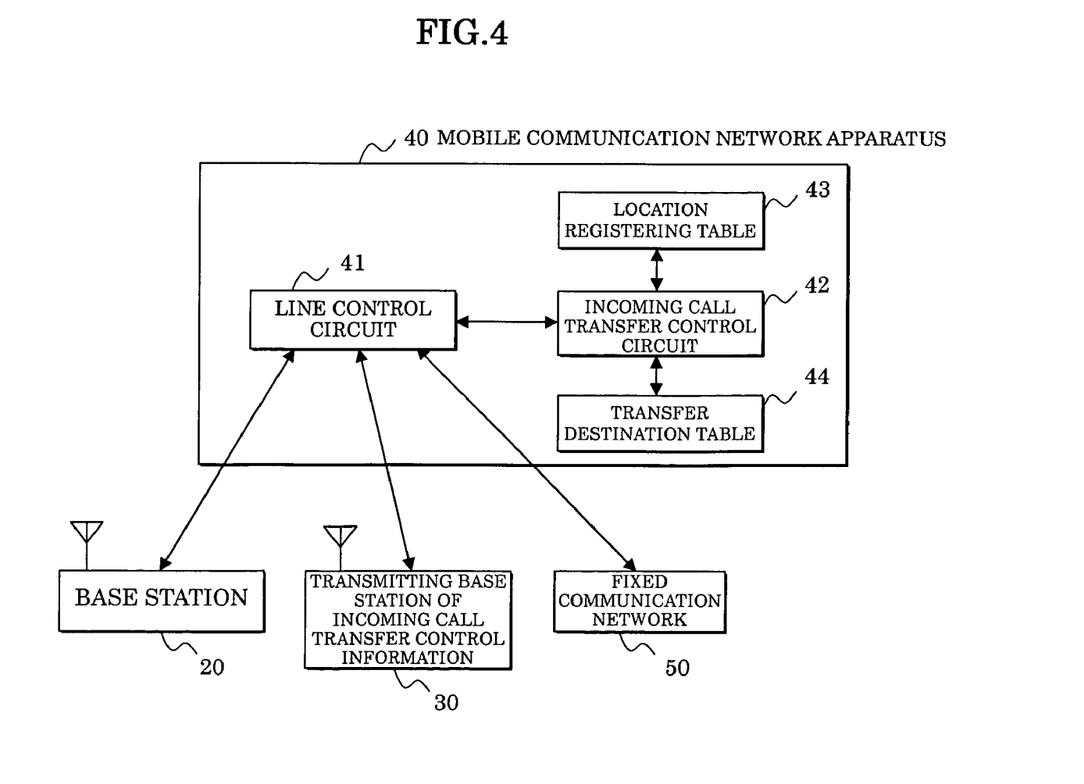
FIG. 4 is a block diagram showing an embodiment of a mobile communication network apparatus according to the present invention.

FIG. 4 shows an embodiment of the mobile communication network apparatus 40, which is composed of a line control circuit 41 connected to the base stations 20, 30, and the fixed communication network 50, an incoming call transfer control circuit 42 connected to the line control circuit 41, a location registering table 43 and a transfer destination table 44 connected to the incoming call transfer control circuit 42.

It is to be noted that the transfer destination table 44 may be included in the location registering table 43.

The location registering table 43 associates the mobile station with the base station where the mobile station is located. The transfer destination table 44 associates the transmitting base station 30 of incoming call transfer control information with a transfer destination telephone number.

It is to be noted that the transfer destination telephone number may be e.g. a telephone number of a fixed telephone or a telephone number of a fixed mobile station. Also, the transfer destination table 44 may associate the transfer destination telephone number for each mobile station.

Figure 5A:
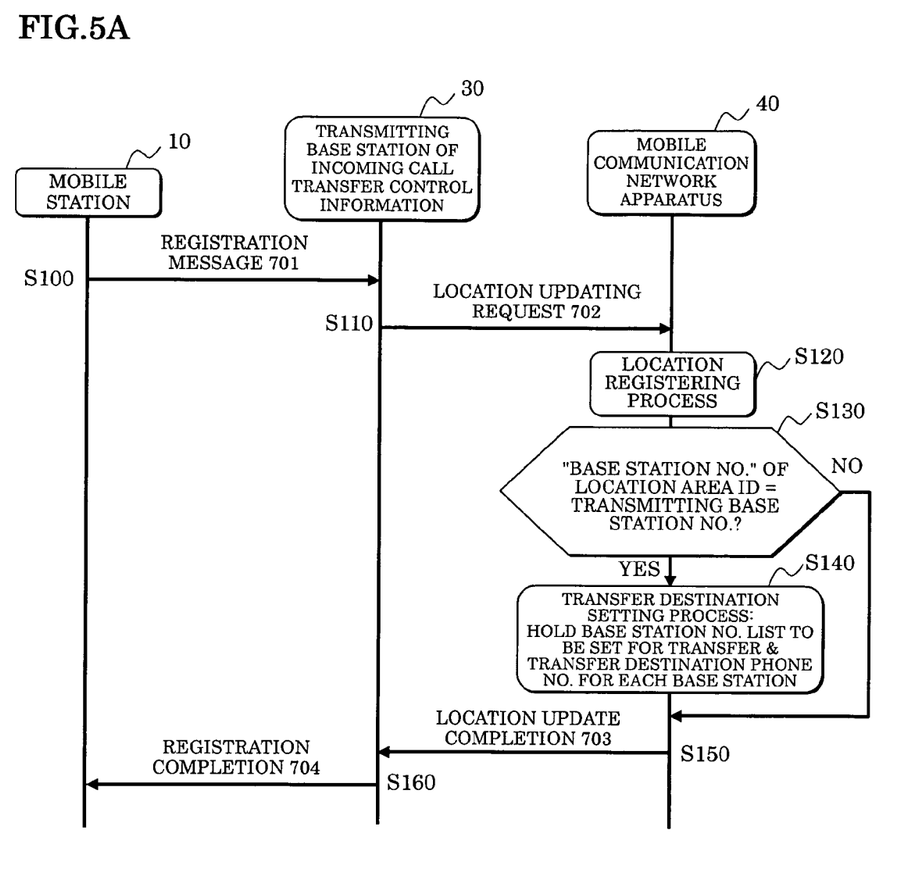
FIG. 5A is a sequence diagram showing a procedure example (1) of a transfer destination setting operation: a mobile communication network apparatus-driven, in a network having, as elements, a mobile communication network apparatus, a transmitting base station of incoming call transfer control information, and a mobile station according to the present invention.

FIG. 5A shows a procedure example (1) of transfer destination setting operation in the network shown in FIG. 1. In this operation procedure example (1), the mobile communication network apparatus 40-driven incoming call transfer destination setting is performed.

It is to be noted that in the operation procedure example (1), the mobile station 10 is not only a mobile station having the arrangement shown in FIG. 2, but also a prior art mobile station. Also, the base station 30 does not require the transmitting circuit 31 shown in FIG. 3, so that it may have a base station having the same arrangement of the prior art base station 20.

In the mobile communication network apparatus 40, only the incoming call transfer control circuit 42 and the transfer destination table 44 shown in FIG. 4 are added to a prior art mobile communication network apparatus. The base station 30 is registered in the transfer destination table 44.

The operation procedure when the mobile station 10 has entered the communication area 30a of the base station 30 in FIG. 1 will now be described based on FIG. 5A.

Step S100: Mobile station 10 transmits a registration message 701 to the base station 30.

Step S110: The base station 30 transmits a location updating request 702 to the mobile communication network apparatus 40.

Figure 5B:
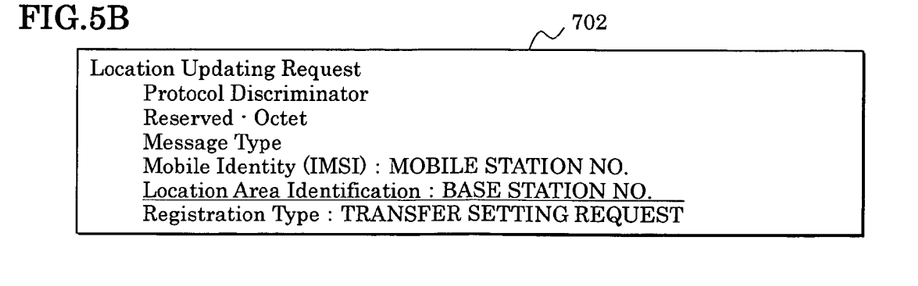
FIG. 5B is a format diagram of a location updating request.

FIG. 5B shows the location updating request 702, which includes mobile identity="mobile station No.", location area identification="base station No.", and registration type="transfer setting request".

It is to be noted that the "transfer setting request" is for activating the incoming call for the mobile station located in the communication area of the specific base station to be transferred, and may be a signal form different from the location updating request 702.

Step S120: In the mobile communication network apparatus 40, the incoming call transfer control circuit 42 performs a location registration of the mobile station 10 in the location registering table 43 (see FIG. 4) based on the location updating request 702.

Steps S130 and S140: Furthermore, when the location area identification="base station No." indicated in the location updating request 702 is registered in the transfer destination table 44, the incoming call transfer control circuit 42 determines that the base station 30 is the transmitting base station (specific base station) of incoming call transfer control information and performs transfer destination setting process.

Namely, the incoming call transfer control circuit 42 associates the base station 30 No. with the transfer destination telephone number in the transfer destination table 44, and displays that the base station 30 is in a transfer setting state.

It is to be noted that the specific base station may be preliminarily registered in the transfer destination table 44. While each specific base station may register its own station, the base station is required, in this case, to identify itself as the specific base station.

Also, the transfer destination telephone number may be preliminarily associated with the base station to be registered. Alternatively, the transfer destination telephone number may be included in the location updating request 702 to be notified to the incoming call transfer control circuit 42. However in this case, the base station 30 is required to know the transfer destination telephone number.

Thus, hereafter, the incoming call for the mobile station 10 located in the communication area 30*a* of the base station 30 is transferred to the telephone of the transfer destination telephone number.

Steps S150 and S160: The mobile communication network apparatus 40 transmits a location update completion 703 to the base station 30, which transmits a registration completion 704 to the mobile station 10 to complete the transfer destination setting operation.

Figure 6A:
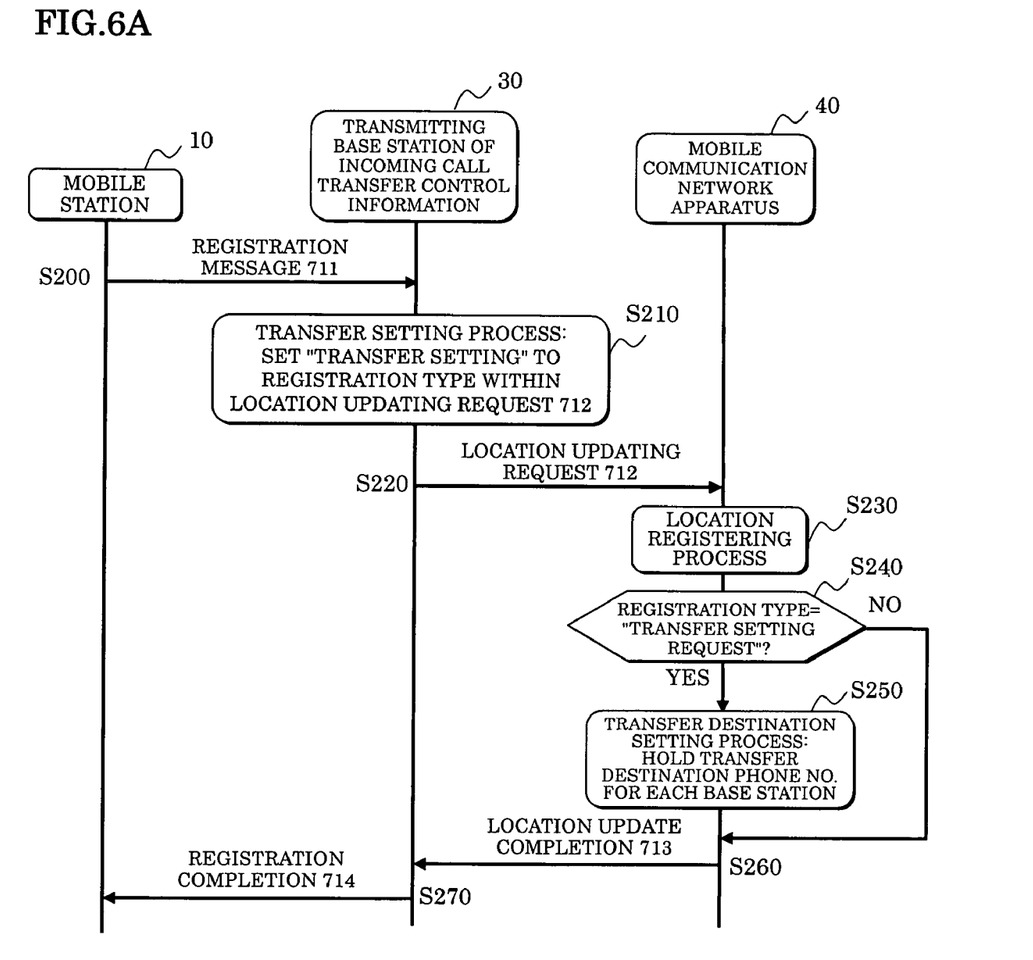
FIG. 6A is a sequence diagram showing a procedure example (2) of a transfer destination setting operation: a transmitting base station of incoming call transfer control information-driven, in a network having, as elements, a mobile communication network apparatus, a transmitting base station of incoming call transfer control information, and a mobile station according to the present invention.

FIG. 6A shows a procedure example (2) of transfer destination setting operation in the network shown in FIG. 1. In this operation procedure example (2), the base station 30-driven incoming call transfer destination setting is performed.

It is to be noted that in the operation procedure example (2), the mobile station 10 is not only a mobile station having the arrangement shown in FIG. 2 but also a prior art mobile station in the same way as the operation procedure example (1). Also, while the base station 30 does not require the transmitting circuit 31 shown in FIG. 3, a function of performing a transfer setting is provided.

Namely, the base station 30 has a function of setting "transfer setting request (new code)" to the prior art registration type of the location updating request.

Also, the mobile communication network apparatus 40 is provided with the incoming call transfer control circuit 42 and the transfer destination table 44 as shown in FIG. 4. Furthermore, the base station 30 is registered in the transfer destination table 44 of the mobile communication network apparatus 40 shown in FIG. 4.

The operation procedure example when the mobile station 10 has entered the communication area 30*a* of the base station 30 in FIG. 1 will now be described based on FIG. 6A.

Step S200: The mobile station 10 transmits a registration message 711 to the base station 30.

Steps S210 and S220: In the base station 30, a registration message receiver (not shown) receives the registration message, and a transfer setting processor (not shown) performs the transfer destination setting process based on the registration message. Namely, the base station 30 transmits a location updating request 712 to the mobile communication network apparatus 40.

Figure 6B:
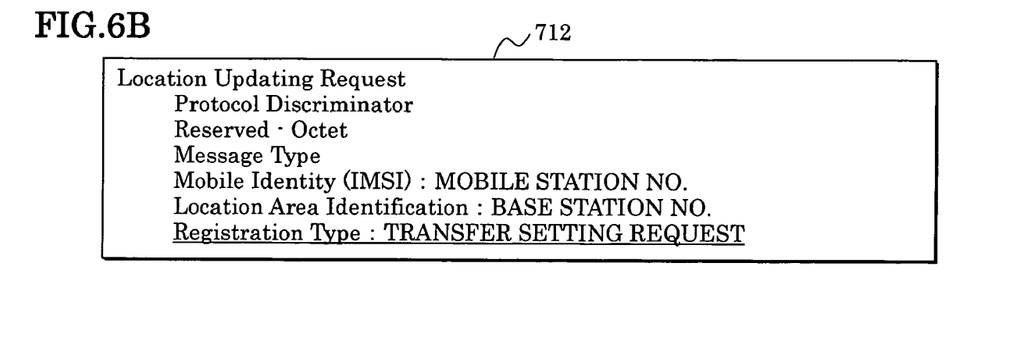
FIG. 6B is a format diagram of a location updating request.

FIG. 6B shows the location updating request 712, which includes a mobile identity="mobile station No.", a location area identification="base station No.", and a registration type="transfer setting request (new code)".

This "transfer setting" indicates that a setting for transferring the incoming call for the mobile station 10 located in the communication area 30*a* of the base station 30 is requested.

Step S230: In the mobile communication network apparatus 40, the incoming call transfer control circuit 42 performs a location registration of the mobile station 10 to the location registering table 43 based on the location updating request 712.

Steps S240 and S250: Furthermore, since the registration type="transfer setting request" in the location updating request 712, the incoming call transfer control circuit 42 determines that the base station 30 is an object of the incoming call transfer, and performs the transfer destination setting process.

Namely, the incoming call transfer control circuit 42 associates the base station 30 No. with the transfer destination telephone number in the transfer destination table 44, and displays that the base station 30 is in a transfer setting state.

It is to be noted that the specific base station may be preliminarily registered in the transfer destination table 44. Also, the transfer destination telephone number preliminarily associated with the base station may be registered or the transfer destination telephone number included in the location updating request 712 may be notified to the incoming call transfer control circuit 42. However in this case, the base station 30 is required to know the transfer destination telephone number.

Thus, hereafter the incoming call for the mobile station 10 located in the communication area 30*a* of the base station 30 is transferred to the telephone having the transfer destination telephone number.

Steps S260 and S270: These steps are the same as steps S150 and S160 of the procedure example (1) of transfer destination setting operation.

Figure 7:
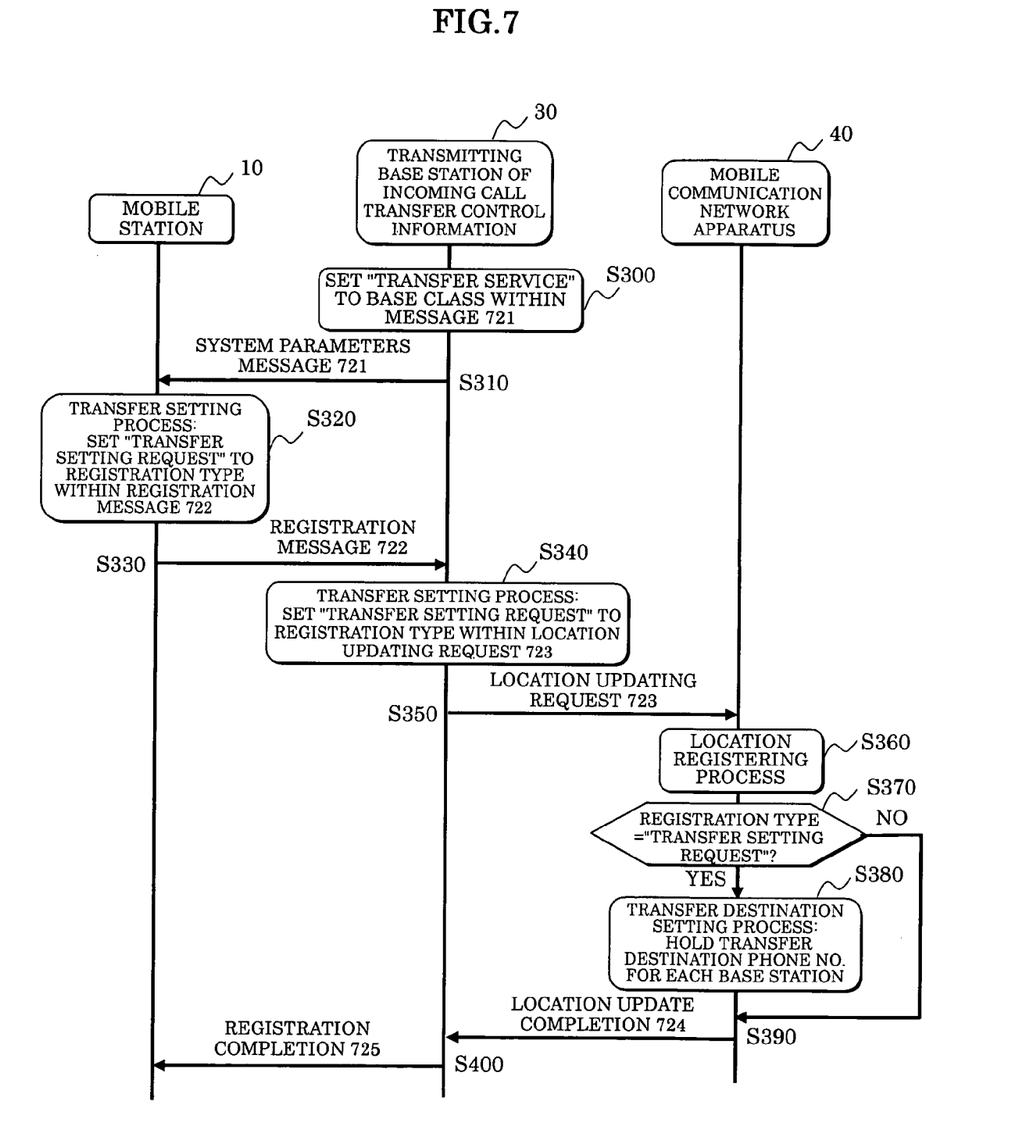
FIG. 7 is a sequence diagram showing a procedure example (3) of a transfer destination setting operation: a mobile station-driven, in a network having, as elements, a mobile communication network apparatus, a transmitting base station of incoming call transfer control information, and a mobile station according to the present invention.

FIG. 7 shows a procedure example (3) of transfer destination setting operation in the network shown in FIG. 1. In this operation procedure example (3), the mobile station 10-driven incoming call transfer destination setting is performed.

In the operation procedure example (3), the mobile station 10 is one having the arrangement shown in FIG. 2. The base station 30 has the arrangement shown in FIG. 3, and has a function of setting "transfer setting request (new code)" to the registration type of the prior art location updating request. The base station 30 is registered in the transfer destination table 44 of the mobile communication network apparatus 40 shown in FIG. 4.

The operation procedure example when the mobile station 10 has entered the communication area 30*a* of the base station 30 in FIG. 1 will now be described based on FIG. 7.

Step S310: In the base station 30, the transmitting circuit 31 of incoming call transfer control information (see FIG. 3) transmits a system parameters message 721 including the incoming call transfer control information (base class="transfer service (new code)") indicating that the base station 30 is one to which the incoming call transfer is performed.

Figure 8A:
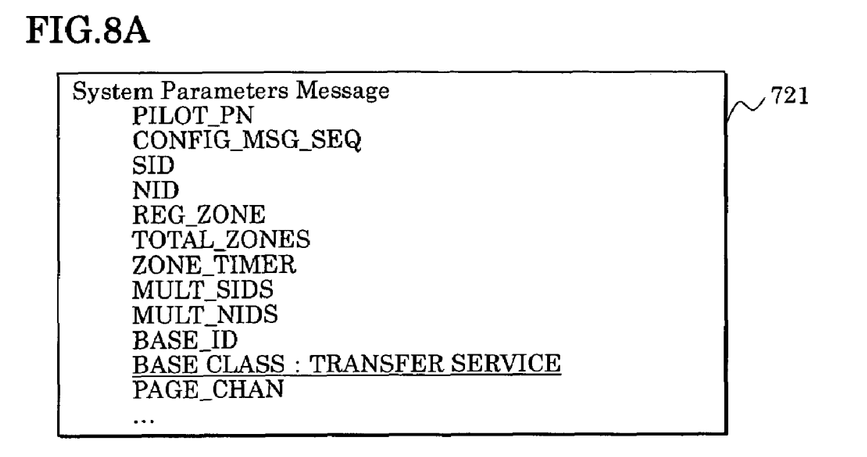
FIGS. 8A-8C are diagrams showing examples of messages and a request in the procedure example (3) of a transfer destination setting operation according to the present invention.

FIG. 8A shows the system parameters message 721, which includes the base class="transfer service". This "transfer service" indicates that the base station is one to which the incoming call transfer is performed.

Steps S320 and S330: In the mobile station 10, the receiving circuit 11 of incoming call transfer control information (see FIG. 2) receives the system parameters message 721. The analysis circuit 12 of incoming call transfer control information analyzes that the base class="transfer service" in the system parameters message 721. Based on this analysis, the transmitting circuit 13 of incoming call transfer request/release performs the transfer destination setting process, i.e. transmits a registration message 722 to the base station 30.

Figure 8B:
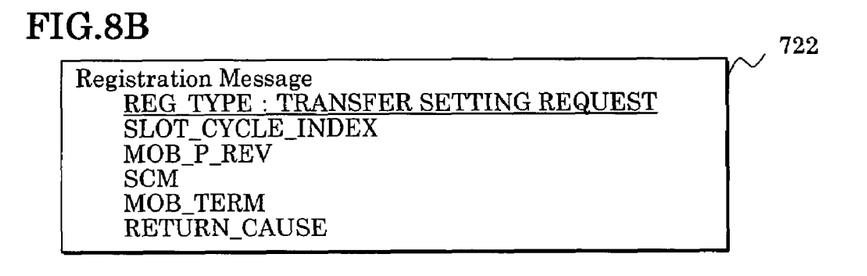

FIG. 8B shows the registration message 722, in which the registration type="transfer setting request (new code)" is set.

Steps S340 and S350: Since the registration type="transfer setting request" in the registration message 722, the base station 30 transmits a location updating request 723 in which the registration type="transfer setting request (new code)" is set in the mobile communication network apparatus 40.

Figure 8C:
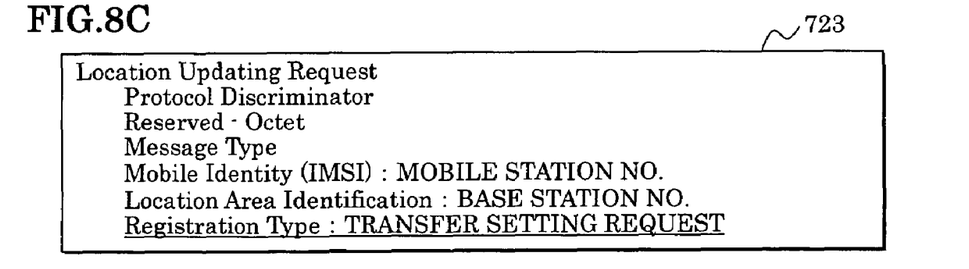

FIG. 8C shows the location updating request 723, which is the same as the location updating request 712 shown in FIG. 6B.

Steps S360-S400: These operations are the same as steps S230-S270 of the procedure example (2) of transfer destination setting operation shown in FIG. 6A.

As a result, in the transfer destination table 44, the base station No. and the transfer destination telephone number are associated with each other to be held. It is also displayed that the base station 30 is in the transfer setting state. Hereafter, the incoming call for the mobile station 10 located in the communication area 30a of the base station 30 is transferred to the telephone having the transfer destination telephone number.

It is to be noted that when located in the communication area of the specific base station 30 and the base station 20, the mobile station 10 selects a signal whose radio field intensity is strong. When the mobile station 10-driven transfer setting is performed in the communication area 30a of the base station 30, the mobile station 10 may suppress a handover of the base station 20 by lowering a threshold value of a signal intensity for the base station 30 and giving high priority to the signal of the base station 30.

Figure 9:
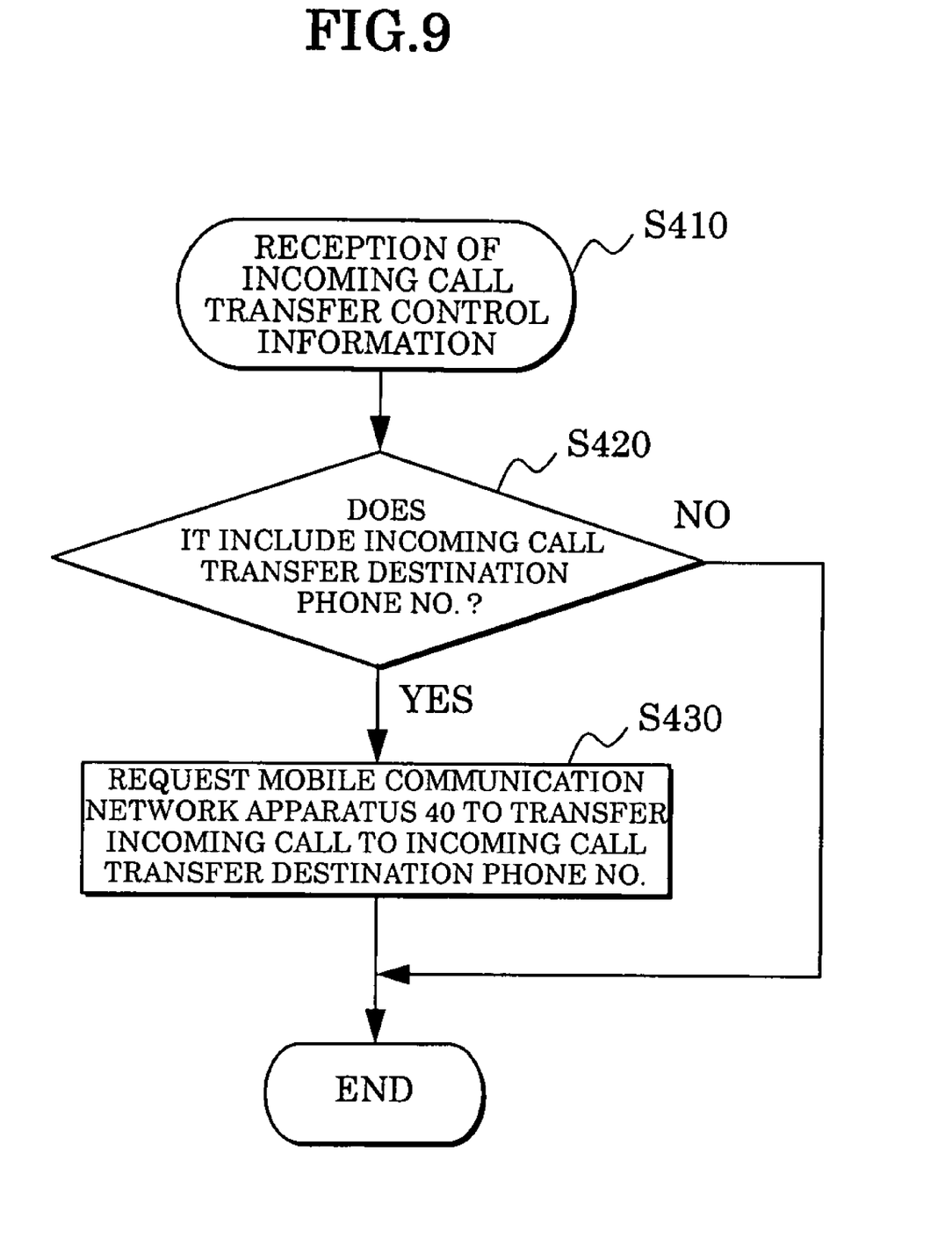
FIG. 9 is a flow chart showing a procedure example (4) of a transfer destination setting operation of a mobile station according to the present invention.

FIG. 9 shows a procedure example (4) of transfer destination setting operation in the network shown in FIG. 1. This operation procedure example (4) indicates a modification of the operation procedure example (3), and the base station designates the transfer destination telephone number.

Step S410: The transmitting base station 30 of incoming call transfer control information always transmits the incoming call transfer control information of the communication area 30a. The mobile station 10 receives the incoming call transfer control information from the base station 30.

Step S420: The mobile station 10 determines whether or not the telephone number of e.g. a fixed telephone 60 of transfer destination (see FIG. 1) exists within the incoming call transfer control information.

Step S430: In the presence of the transfer destination telephone number, the mobile station 10 transmits, to the incoming call transfer control circuit 42 of the mobile communication network apparatus 40, the request of transferring same to the telephone number within the incoming call transfer control information.

Thus, when the mobile station 10 has moved to the communication area 30a of the transmitting base station 30 of incoming call transfer control information, the incoming call for the mobile station 10 is connected to the transfer destination fixed telephone 60.

It is to be noted that in case of the incoming call transfer, the incoming call transfer control circuit 42 may vocally notify the transfer to the transmitting source.

Also, the telephone number within the incoming call transfer control information is not limited to that of the fixed telephone, so that anything having a telephone number can be designated as a transfer destination.

Also, not the base station 30 but the mobile station itself may designate the transfer destination telephone number.

Figure 10A:
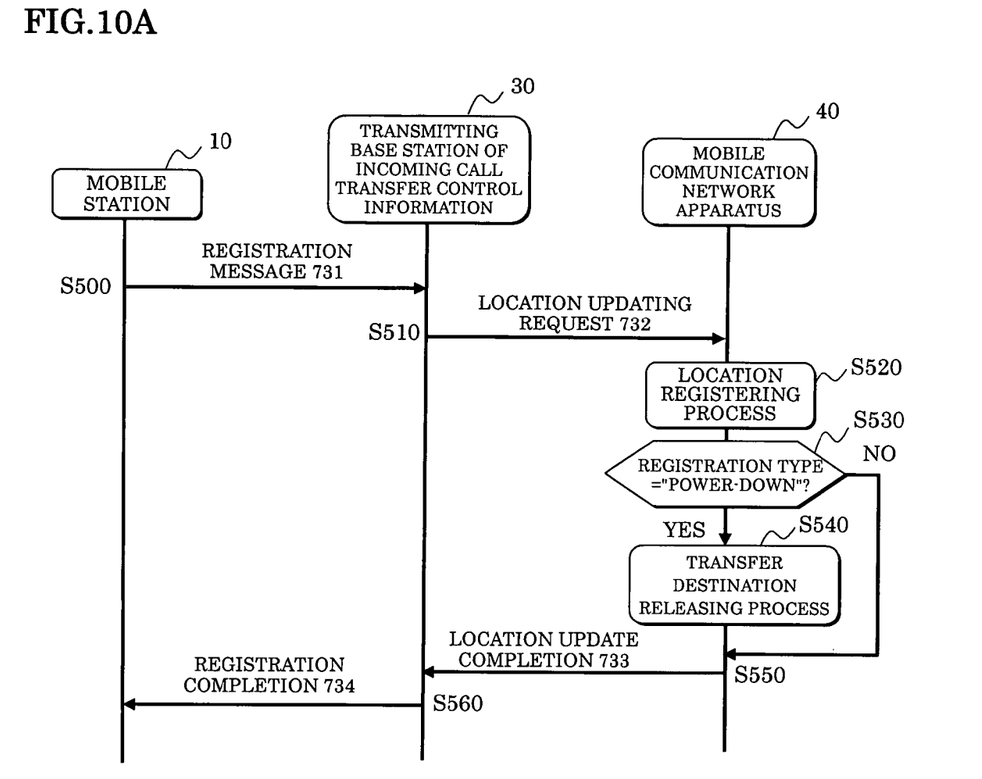
FIG. 10A is a sequence diagram showing a procedure example (1) of a transfer destination releasing operation in a network having, as elements, a mobile communication network apparatus, a transmitting base station of incoming call transfer control information, and a mobile station according to the present invention.

FIG. 10A shows a procedure example (1) of transfer destination releasing operation. This operation procedure example (1) will now be described.

Step S500: When the mobile station 10 is located in the communication area 30a of the base station 30 and a power-down switch is activated, the mobile station 10 transmits a registration message 731 to the base station 30.

Figure 10B:
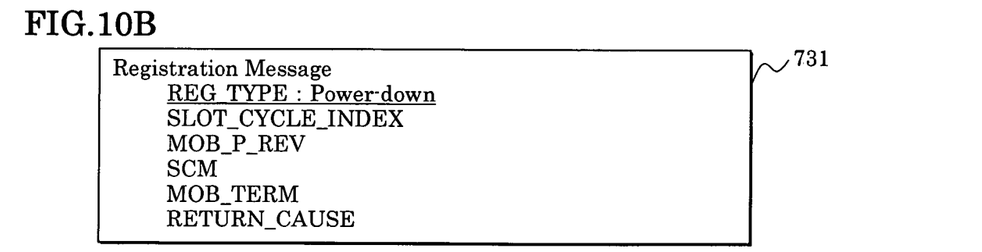
FIGS. 10B and 10C are format diagrams of a registration message and a location updating request.

FIG. 10B shows the registration message 731, in which the registration type="power-down" is set.

Step S510: Since the registration type="power-down" in the received registration message 731, the base station 30 transmits a location updating request 732 to the mobile communication network apparatus 40.

Figure 10C:
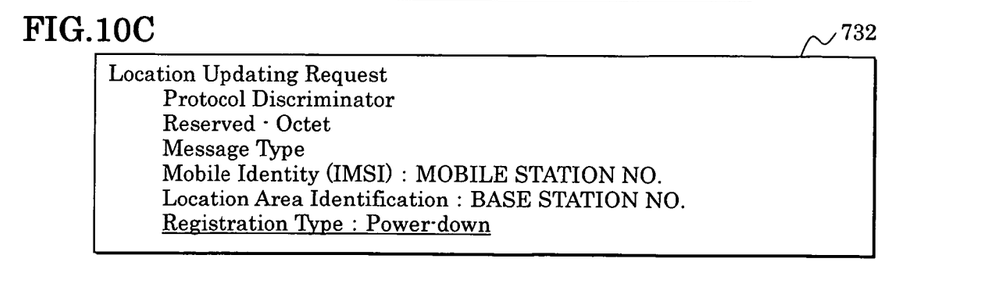

FIG. 10C shows the location updating request 732, in which the registration type="power-down" is set.

Steps S520-S540: The mobile communication network apparatus 40 executes the prior art location registering process, and executes a transfer destination releasing process since the registration type="power-down" in the location updating request 732. Namely, the mobile communication network apparatus 40 releases the transfer destination of the mobile station 10 in the transfer destination table 44.

Steps S550 and S560: The mobile communication network apparatus 40 transmits a location update completion 733 to the base station 30, which completes a transfer destination releasing operation by transmitting a registration completion 734 to the mobile station 10.

Thus, hereafter the mobile communication network apparatus does not perform a transfer of the incoming call for the mobile station 10 which is in a power-down state. It is to be noted that in the operation procedure example (1), a transfer destination release is performed for every mobile station.

Figure 11A:
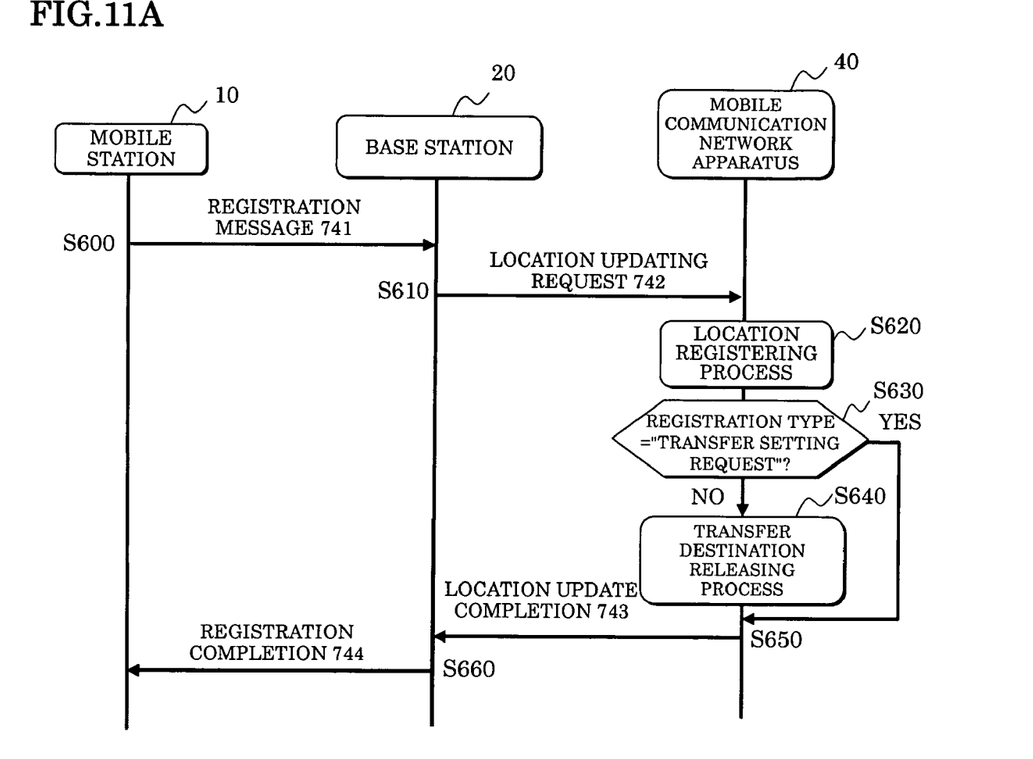
FIG. 11A is a sequence diagram showing a procedure example (2) of a transfer destination releasing operation in a network having, as elements, a mobile communication network apparatus, a transmitting base station of incoming call transfer control information, and a mobile station according to the present invention, and a prior art base station.

FIG. 11A shows a procedure example (2) of transfer destination releasing operation, which will now be described. This operation procedure example (2) indicates a procedure in the case where the mobile station 10 performs a location registration in the prior art base station 20.

Step S600: When having moved to the communication area 20a of the prior art base station 20 from the communication area 30a of the transmitting base station 30 of incoming call transfer control information (not shown), the mobile station 10 transmits a registration message 741 to the base station 20.

Figure 11B:
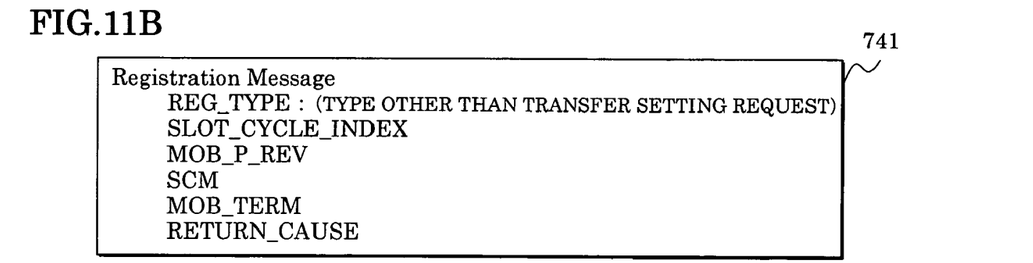
FIGS. 11B and 11C are format diagrams of a registration message and a location updating request.

FIG. 11B shows the registration message 741, in which the registration type="type other than transfer setting", e.g. "location registration" is set.

Step S610: Since the registration type="location registration" in the received registration message 741, the base station 20 transmits a location updating request 742 to the mobile communication network apparatus 40.

Figure 11C:
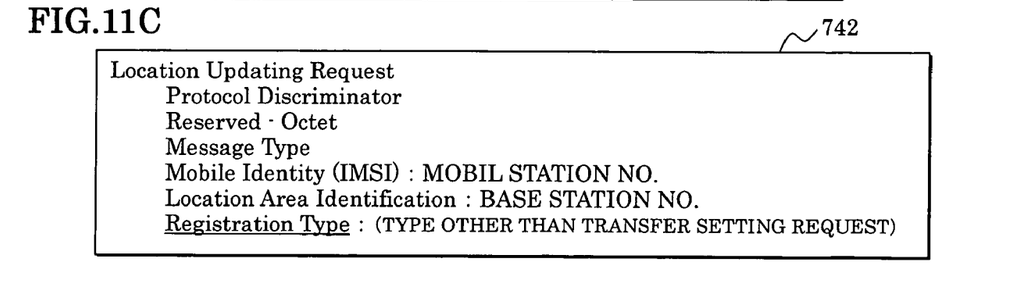

FIG. 11C shows the location updating request 742, in which the registration type="location registration" other than "transfer setting" is set.

Steps S620-S640: In the mobile communication network apparatus 40, the incoming call transfer control circuit 42 performs the prior art location registering process.

Furthermore, since the registration type="location registration", location area identification="base station 20 No.", and mobile identity="mobile station 10 No." in the location updating request 732 from the base station 20, the incoming call transfer control circuit 42 determines that the mobile station 10 has moved to the outside of communication area 30a of the base station 30 and executes the transfer destination releasing process.

Namely, the incoming call transfer control circuit 42 releases the transfer destination of the mobile station 10 corresponding to the mobile identity="mobile station No." set in the transfer destination table 44.

Steps S650 and S660: These steps are the same as steps S550 and S560 of the procedure example (1) of transfer destination releasing operation.

Thus, it becomes possible for the mobile communication network apparatus not to perform an incoming call transfer hereafter, upon receiving an incoming call for the mobile station 10. It is to be noted that in the operation procedure example (2), the transfer destination release is performed for every mobile station in the same way as the operation procedure example (1).

Figure 12:
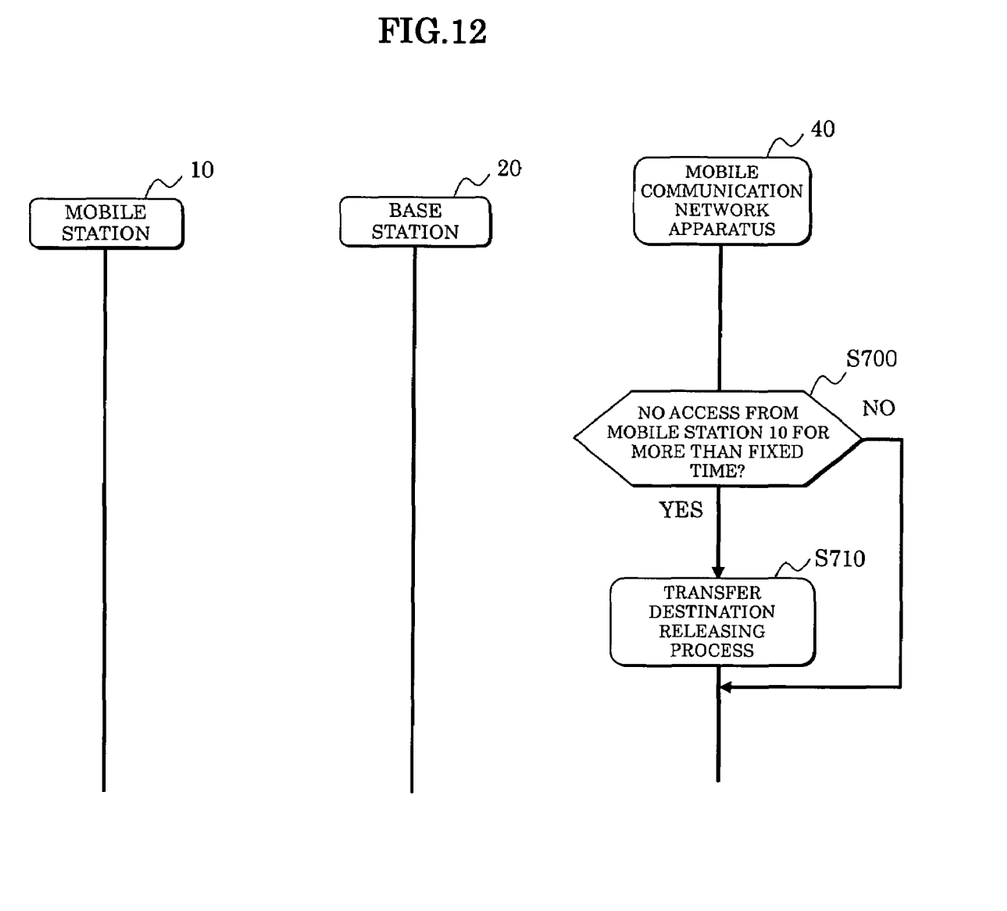
FIG. 12 is a sequence diagram showing a procedure example (3) of a transfer destination releasing operation in a network having, as elements, a mobile communication network apparatus, a transmitting base station of incoming call transfer control information, and a mobile station according to the present invention, and a prior art base station.

FIG. 12 shows a procedure example (3) of transfer destination releasing operation, which will now be described.

Steps S700 and S710: When there is no access for more than a predetermined time from the mobile station 10, the mobile communication network apparatus 40 executes the transfer destination releasing process.

Thus, it becomes possible for the mobile communication network apparatus not to transfer the incoming call for the mobile station 10 hereafter.

As described above, a mobile communication network apparatus according to the present invention is arranged such that an incoming call for a mobile station is transferred based on a transfer destination table which associates a specific base station with a transfer destination telephone number. Alternatively, a base station according to the present invention is arranged such that a transfer setting request is made which activates the incoming call for the mobile station located in its communication area to be transferred to a predetermined transfer destination telephone number, to the mobile communication network apparatus. Alternatively, a mobile station according to the present invention is arranged such that a transfer setting request is transmitted which activates the incoming call for its own station to be transferred to a predetermined telephone number, to the mobile communication network apparatus through the specific base station when incoming call transfer control information transmitted by the specific base station is received. Therefore, it becomes possible to transfer the incoming call for the mobile station which has moved to an area where a call is regulated in a service area of the mobile communication network to a predetermined telephone number.

Since this incoming call transfer is automatically performed, a call with a fixed telephone instead of a mobile telephone is made possible in an area where a call with a mobile telephone (mobile station) is regulated such as a hospital, thereby facilitating users' convenience.

I claim:

1. A mobile communication network apparatus comprising:
    a transfer destination table which associates a base station with a transfer destination telephone number of an incoming call for a mobile station located in a call-regulated area of the base station and
    an incoming call transfer control circuit transferring the incoming call for the mobile station to the transfer destination telephone number based on the transfer destination table,
    wherein the base station transmits a transfer setting request, which activates a transfer of the incoming call for the mobile station located in the call-regulated area of the base station to the transfer destination telephone number and the incoming call transfer control circuit activates the transfer upon receiving the transfer setting request,
    wherein the transmitting circuit of incoming call transfer request/release notifies a transfer setting release request for releasing transfer setting to the mobile communication network apparatus when the incoming call transfer control information is not received for more than a fixed time, when an intensity of radio wave becomes equal to or less than a predetermined threshold value, or when a power-down switch is activated.

2. The mobile communication network apparatus as claimed in claim 1 wherein the transfer setting request is included in a location updating request.

3. The mobile communication network apparatus as claimed in claim 2 wherein the transfer destination telephone number is notified from the mobile station through the base station.

4. The mobile communication network apparatus as claimed in claim 1 wherein the transfer destination table associates a transfer destination telephone number with each mobile station.

5. The mobile communication network apparatus as claimed in claim 1 wherein information for releasing a transfer destination of the transfer destination table is notified from the mobile station through the base station.

6. The mobile communication network apparatus as claimed in claim 1 wherein the base station transmits a transfer setting request upon a power-down of the mobile station as a trigger.

7. The mobile communication network apparatus as claimed in claim 1 wherein the incoming call transfer control circuit vocally notifies an incoming call transfer to a transmitting source.

8. A base station comprising:
    a registration message receiver for receiving a registration message from a mobile station located in a call-regulated area of the base station; and
    a transfer setting processor for transmitting to a mobile communication network apparatus, a transfer setting request which activates a transfer of an incoming call for a mobile station located in the call-regulated area to a predetermined transfer destination telephone number,
    wherein the transmitting circuit of incoming call transfer request/release notifies a transfer setting release request for releasing transfer setting to the mobile communication network apparatus when the incoming call transfer control information is not received for more than a fixed time, when an intensity of radio wave becomes equal to or less than a predetermined threshold value, or when a power-down switch is activated.

9. The base station as claimed in claim 8 wherein the transfer setting request is included in a location updating request.

10. The base station as claimed in claim 8 wherein the transfer destination telephone number is associated with each mobile station.

11. The base station as claimed in claim 10 wherein the transfer destination telephone number is notified from the mobile station.

12. The base station as claimed in claim 8 wherein the transfer setting processor notifies information for releasing a transfer setting of the incoming call to the mobile communication network apparatus.

13. The base station as claimed in claim 8 wherein the transfer setting processor transmits the transfer setting request upon a power-down of the mobile station as a trigger.

14. A mobile station comprising:
    a receiving circuit of incoming call transfer control information for receiving incoming call transfer control information transmitted by a base station; and
    a transmitting circuit of incoming call transfer request/release for transmitting a transfer setting request which activates an incoming call for its own station to be transferred to a predetermined telephone number, to a mobile communication network apparatus through the base station when the receiving circuit receives the incoming call transfer control information,
    wherein the transmitting circuit of incoming call transfer request/release notifies a transfer setting release request for releasing transfer setting to the mobile communication network apparatus when the incoming call transfer control information is not received for more than a fixed time, when an intensity of radio wave becomes equal to or less than a predetermined threshold value, or when a power-down switch is activated.

15. The mobile station as claimed in claim 14 wherein the transfer setting request is included in a location updating request.

16. The mobile station as claimed in claim 14 wherein the mobile communication network apparatus preliminarily holds the transfer destination telephone number.

17. The mobile station as claimed in claim 14 wherein the transmitting circuit of incoming call transfer request/release notifies the transfer destination telephone number to the mobile communication network apparatus.

18. The mobile station as claimed in claim 17 wherein the transfer destination telephone number is associated with each mobile station.

19. The mobile station as claimed in claim 17 wherein the transfer destination telephone number is notified from the base station.

20. The mobile station as claimed in claim 14 wherein the transmitting circuit of incoming call transfer request/release notifies a transfer setting request to the mobile communication network apparatus when a power-down switch is activated.

21. The mobile station as claimed in claim 14 wherein the receiving circuit of incoming call transfer control information lowers a threshold value of a signal intensity corresponding to the base station when signals are received from a plurality of base stations.

\* \* \* \* \*